United States Patent [19]
Arsenius et al.

[11] 4,060,288
[45] Nov. 29, 1977

[54] SUPPORT IN HYDROSTATIC BEARINGS

[75] Inventors: Torsten Henry Arsenius, Goteborg; Sven Christian Bildtsén, Lerum, both of Sweden

[73] Assignee: SKF Industrial Trading and Development Company B.V., Jutphaas, Netherlands

[21] Appl. No.: 676,309

[22] Filed: Apr. 9, 1976

[30] Foreign Application Priority Data

Apr. 23, 1975 South Africa .................. 75/2286

[51] Int. Cl.² ............................................. F16C 17/06
[52] U.S. Cl. ......................................... 308/73; 308/122
[58] Field of Search .................. 308/9, 72, 73, 122, 308/123, 160

[56] References Cited
U.S. PATENT DOCUMENTS

| 2,171,208 | 8/1939 | Dall et al. | 308/73 |
| 2,235,931 | 3/1941 | Kingsbury | 308/73 |
| 2,719,065 | 9/1955 | Hornbostel | 308/122 |
| 3,711,169 | 1/1973 | Gardner | 308/73 |

Primary Examiner—Joseph F. Peters, Jr.
Assistant Examiner—Gene A. Church

[57] ABSTRACT

In a hydrostatic bearing for rotatably supporting therein a member comprising a shoe having an arcuate first surface confronting the member and having formed therein a pocket for a fluid under pressure, the first surface and said member being of a predetermined relative configuration to provide essentially a line contact therebetween, the improvement comprising means defining a projection in said pocket having a second surface confronting the member of generally the same contour as said first surface to provide an additional essentially line contact between said member and said second surface.

4 Claims, 6 Drawing Figures

SUPPORT IN HYDROSTATIC BEARINGS

BACKGROUND OF THE INVENTION

The present invention relates to self-aligning hydrostatic shoe bearings.

Bearings of the above type are commonly used in large mills for grinding ore or the like. These mills generally comprise a large cylindrical body of considerable weight having runners at opposite ends which are journalled in hydrostatic shoe bearings. These hydrostatic bearings are well known and as shown in British Patent Nos. 1,330,484, 1,309,518 and 1,359,839, generally consist of a shoe having an arcuate supporting surface for the runner, a cavity defining a pocket in the supporting surface for a fluid medium, for example, oil. During operation of these bearings, oil is continuously delivered to the pocket and flows out on the upper surface of the shoe whereby the runners are supported on an oil film under high pressure. When the mill is stopped, the supply of oil to the shoe is cut off with the result that the runner weight bears directly against the bearing shoe. The radius of the runner is generally smaller than the radius of curvature of the bearing shoe so that a line contact occurs between the runner and bearing shoe when the machine is at rest. The bearing shoe is usually supported on a fixed support by means of a ball disposed generally centrally of the cavity or pocket for the pressure fluid. Thus, there is no support of the runner of the mill at the central part of the pressure fluid pocket directly over the ball support. Consequently, the load on the shoe will tend to bend the sides of the shoe. In view of the considerable weight of these mills, the surface pressure at the line contact is very high thus presenting the risk of surface damage, such as smearing.

SUMMARY OF THE INVENTION

With the above in mind, it is an object of the present invention to provide an improvement in self-aligning hydrostatic shoe bearings which provides support for the runner directly in the area of the ball support thereby eliminating the problem of shoe damage when the runner is at rest. This is accomplished by providing a support surface in the form of a projection in the central part of the pressure fluid pocket which has an arcuate surface confronting the runner and which surface is of a predetermined configuration in relation to the surface of the shoe outboard of the hydrostatic pocket to provide an additional line contact between the runner and the shoe at a location overlying the ball support. In this way, the load is more directly transmitted to the ball support. Additionally, since the line contact is longer, the surface pressure along the line contact will be lower.

BRIEF DESCRIPTION OF THE FIGURES

These and other objects of the present invention and the various features and details of the operation and construction of a self-aligning hydrostatic shoe bearing in accordance with the present invention are hereinafter more fully set forth with reference to the accompanying drawings, wherein.

DESCRIPTION OF A SPECIFIC EMBODIMENT

Figure 1:
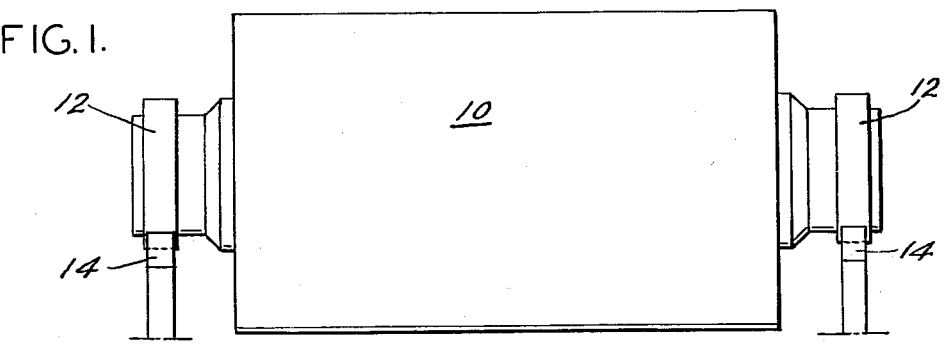
FIG. 1 is a side elevational view of a mill for grinding or the like incorporating hydrostatic shoe bearing supports in accordance with the present invention.
Figure 2:
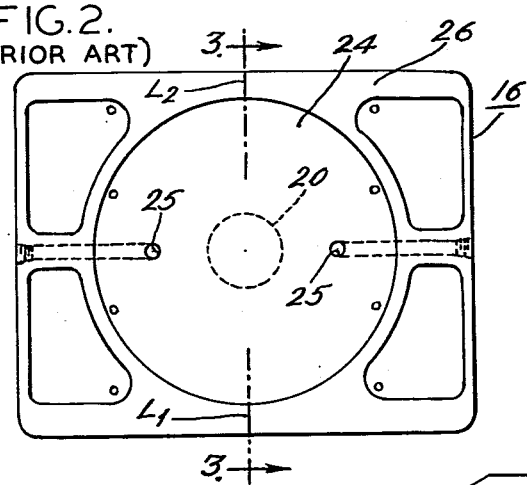
FIG. 2 is a top plan view of a conventional hydrostatic bearing of the prior art type.
Figure 3:
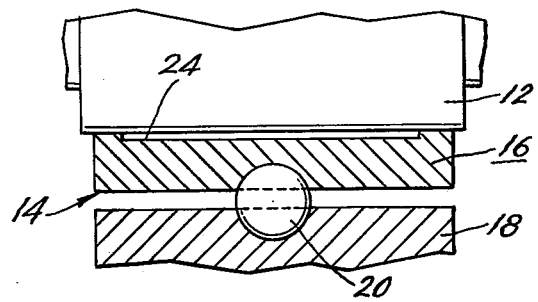
FIG. 3 is a sectional view taken on lines 3—3 of FIG. 2.
Figure 4:
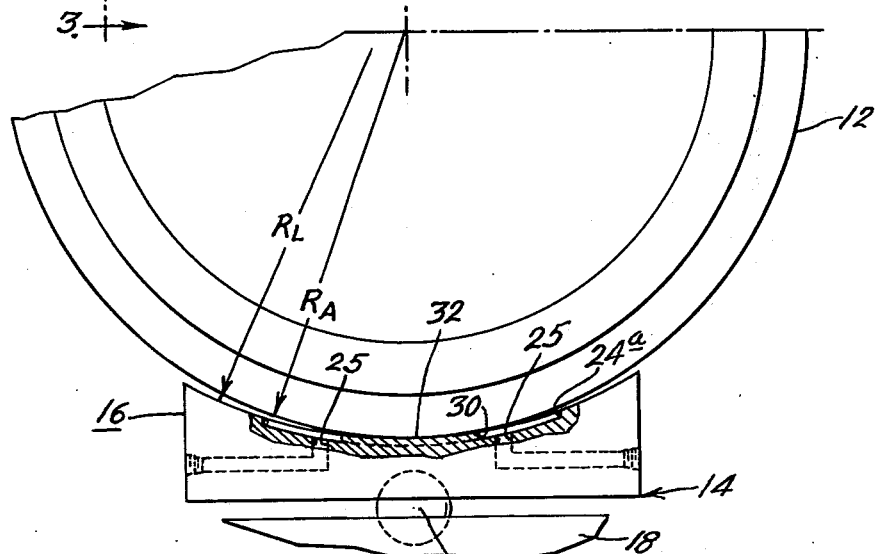
FIG. 4 is an enlarged fragmentary end view of the hydrostatic shoe bearing of the present invention.
Figure 5:
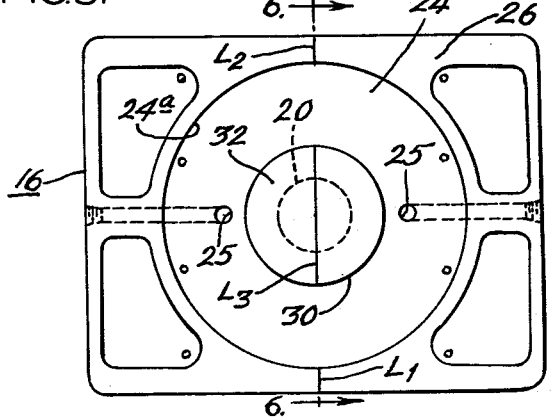
FIG. 5 is a top plan view of the bearing of the present invention.
Figure 6:
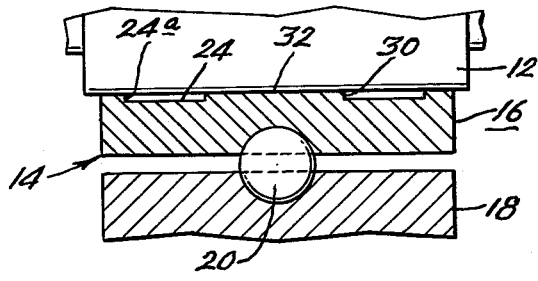
FIG. 6 is a sectional view taken on lines 6—6 of FIG. 5.

Referring now to the drawings and particularly FIG. 1 thereof, there is illustrated a mill for grinding ore or the like comprising a generally cylindrical body portion or drum 10 having runners 12 at opposite ends which are journalled in hydrostatic bearings generally designated by the numeral 14. Suitable drive means (not shown) rotates the drum. A conventional hydrostatic bearing shown in FIG. 2 generally consists of a shoe 16 supported on a rigid base 18 by a ball 20, the base 18 and lower face of the shoe 16 having suitable recesses to mount the ball in the manner illustrated. The bearing shoe has a pocket 24 in its upper arcuate face 26 for a pressure fluid, such as oil, delivered to the pocket through openings 25 connected by suitable lines to a pressure fluid supply source (not shown). The bearing surface 26 of the shoe confronting the runner is of curved cross section and is preferably of a radius of curvature $R_L$ greater than the radius of curvature of the runner $R_a$.

In operation, therefore, when the mill is rotating, pressure fluid is supplied to the pocket to support the runners on a pressurized oil film. When the mill is shut down, the pressure fluid from the supply source is cut off and the runners engage directly the bearing surface 26 of the runner. The engagement of the runner 12 and the support surface 26 of the shoe is a line contact $L_1$ and $L_2$ on opposite sides of a vertical line through the ball support 20. As noted above, this results in bending and deformation of the bearing surface of the shoe which is, of course, undesirable. The problem may be somewhat minimized by making the bearing shoe higher, or utilizing a material having greater strength. The surface pressure, however, remains the same, notwithstanding the height or quality of the material of the bearing shoe. Besides, this approach would result in a higher manufacturing cost.

In accordance with the present invention, means is provided for overcoming the bending action by providing an additional support surface aligned with the ball support. The support surface, as illustrated, is in the form of a projection 30 of circular profile in plan generally concentric with the outer peripheral wall 24a of the pocket 24. The projection 30 has an arcuate upper face 32 conforming to the profile of the upper face of the shoe surrounding the pocket. That is, the face 32 has the same radius of curvature $R_L$ as the bearing surface 26. Since the support surface 32 of the projection has the same curvature as the sides of the bearing shoe, its surface is therefore flush with the sides. By this arrangement the runner 12 engages the bearing surfaces 26 and 32 along the lines $L_1$, $L_2$ and $L_3$. In this fashion, the load is more directly conducted to the ball 20. Furthermore, by reason of extending the line contact between the shoe and runner, the surface pressure along the line contacts will be lower. It is noted that the projection 30 will not change the bearing conditions of the shoe when the oil pressure is on and the runner is running. As there is no oil outlet in the protuberance a static oil pressure will exist about it.

Even though a particular embodiment of the invention has been illustrated and described herein, it is not intended to limit the invention and changes and modifications may be made therein within the scope of the following claims.

We claim:

1. In a hydrostatic bearing for rotatably supporting therein a member comprising a shoe having an arcuate first surface confronting the member and having formed therein a pocket for a fluid under pressure, the first surface and said member being of a predetermined relative configuration to provide essentially a line contact between said member and the surface of said shoe at diametrically opposed locations in said arcuate first surface, the improvement comprising means defining a projection in said pocket having a second surface confronting the member of generally the same contour as said first surface to provide an additional essentially line contact between said member and said second surface generally aligned with the line contact between said member and said arcuate first surface and disposed approximately midway therebetween.

2. In a hydrostatic bearing as claimed in claim 1 wherein said first surface has a radius of curvature greater than the radius of curvature of said member and said second surface has a radius of curvature approximately equal to the radius of curvature of said first surface.

3. In a hydrostatic bearing as claimed in claim 1 wherein said projection is generally circular and is spaced relative to the outer wall defining said pocket to provide an annular recess therebetween.

4. In a hydrostatic bearing as claimed in claim 1 including a ball support between said shoe and a rigid support for said bearing and wherein said projection overlies said ball support.

* * * * *